United States Patent

Takasu et al.

[11] Patent Number: 5,101,790
[45] Date of Patent: Apr. 7, 1992

[54] KNOCK CONTROL SYSTEM FOR ENGINE

[75] Inventors: Yasuhito Takasu, Toyohashi; Minoru Hotta, Nagoya; Hiroshi Ikeda, Kariya, all of Japan

[73] Assignee: Nippondenso Co., Ltd., Kariya, Japan

[21] Appl. No.: 596,300

[22] Filed: Oct. 15, 1990

[30] Foreign Application Priority Data

Oct. 18, 1989 [JP] Japan ................. 1-271373

[51] Int. Cl.$^5$ .............................................. F02P 5/14
[52] U.S. Cl. .................................... 123/425; 123/435
[58] Field of Search ........................ 123/425, 435; 364/431.08; 73/35

[56] References Cited

U.S. PATENT DOCUMENTS

| | | | |
|---|---|---|---|
| 4,617,895 | 10/1986 | Sakakibara et al. | 123/425 |
| 4,711,212 | 12/1987 | Haraguchi . | |
| 4,711,214 | 12/1987 | Sakakibara et al. | 123/425 |
| 4,821,194 | 4/1989 | Kawamura | 364/431.08 |
| 4,884,206 | 11/1989 | Mate | 123/425 |
| 4,899,710 | 2/1990 | Takahashi | 123/425 |
| 4,964,388 | 10/1990 | Lefebvre | 123/435 |

FOREIGN PATENT DOCUMENTS

| | | |
|---|---|---|
| 62-267574 | 11/1987 | Japan . |
| 63-38686 | 2/1988 | Japan . |
| 1-116283 | 5/1989 | Japan . |
| 1-117987 | 5/1989 | Japan . |
| 1-315649 | 12/1989 | Japan . |

Primary Examiner—Raymond A. Nelli
Attorney, Agent, or Firm—Cushman, Darby & Cushman

[57] ABSTRACT

A knock control system which detects a knock occurring in an engine, a knock detector for detecting the occurrence of the knock in accordance with a knock sensor signal produced by the sensor, a first adjuster for adjusting knock control factors so as to suppress the knock on the basis of a detected signal from the knock detector, a converter for converting the knock sensor signal so as to make the frequency distribution of the knock sensor signal equal to an exponential distribution, a standard deviation calculator for calculating the standard deviation of the exponential distribution, and a second adjuster for adjusting knock control factors so that this standard deviation reaches a predetermined value, whereby the standard deviation of the frequency distribution of the knock sensor signal can be easily detected, thus making it possible to reduce the load on the electronic control system and prevent the knock detection precision from being reduced by the characteristic change of the knock sensor, engine.

18 Claims, 7 Drawing Sheets

KNOCK CONTROL SYSTEM FOR ENGINE

BACKGROUND OF THE INVENTION

1. Field of the Invention

This invention relates to a knock control system (KCS) for an engine which detects a knock occurrence in an engine and controls knock controlling factors (for example, ignition timing, air-fuel ratio and overfeed pressure).

2. Description of the Prior Art

The prior art has had problems leading into lowered precision of a knock judgement due to a deviation of the knock judgement level from the optimum value because of scatter in characteristics of engines, knock sensors and so on in their initial stage of usage, or changes of these characteristics with the passage of time. To solve this problem, a knock control system for an engine was proposed which can automatically correct the knock judgement level on the basis of the frequency distribution of the logarithmic conversion value of the knock sensor signal, because the frequency distribution of the logarithmic conversion value of the knock sensor signal becomes a normal distribution when no knock occurs, as disclosed in, for example, JP-A-267574/87.

Moreover, applicants of this invention filed another Japanese Application No. 147885/1988, in which the knock judgement level is updated many times so as to get fast convergence toward the optimum value by setting the knock judgement level in accordance with the standard deviation of the frequency distribution.

In the above system, however, in order to compute the standard deviation of the frequency distribution at a high speed enough for the actual control, it is necessary to burden a heavy load on computing means (for example, CPU) and storage means (for example, RAM and ROM). Therefore, there is the problem that it is difficult for this system to be applied to the concentrated control system (system for making ignition timing control, knock control, air-fuel control and so on by a single electronic control system) which has recently attracted public attention.

SUMMARY OF THE INVENTION

It is an object of the invention to provide a knock control system for an engine which can suitably control knock without imposing a large load on the electronic control system.

Thus, according to this invention, there is provided, as shown in FIG. 1, a knock control system for engine comprising a knock sensor for detecting a knock occurring in an engine, knock detecting means for detecting an occurrence of the knock in accordance with a knock sensor signal produced by the knock sensor, first adjusting means for adjusting a plurality of knock controlling factors in order to suppress the knock in response to a detection signal from the knock detecting means, conversion means for converting the peak values of the knock sensor signal so that the frequency distribution of the peak values becomes an exponential distribution, standard deviation calculating means for calculating the standard deviation of the exponential distribution, and second adjusting means for adjusting the knock controlling factors so that the standard deviation becomes a desired value.

Moreover, the conversion means preferably has reference level setting means for setting a reference level in relation to the peak value of the knock sensor signal, and duration detecting means for detecting a duration for which the peak values of the knock sensor signal successively exceed the reference level within a predetermined period of time.

Also, the duration detecting means preferably has counting means for counting the number of the peak values successively exceeding the reference level within the predetermined period of time.

Moreover, the duration detecting means preferably has peak value detecting means for detecting the peak value of the knock sensor signal within the predetermined period, median value calculating means for calculating the median value of the frequency distribution of the peak value, and duration calculating means for calculating the duration in accordance with the peak value and the median value.

In addition, the second adjusting means is preferably used to adjust at least one of the knock judgement level and the ignition timing.

Also, the knock detecting means can also be used for detecting the occurrence of the knock in accordance with the knock judgement level adjusted by the second adjusting means.

Thus, the knock occurring in the engine is detected by the knock sensor. The knock detecting means detects the knock in accordance with the knock sensor signal from the knock detecting means, and the first adjusting means adjusts the knock controlling factors so as to suppress the knock in accordance with the detected result.

The conversion means converts the peak values of the knock sensor signal so that the frequency distribution of the peak values becomes an exponential distribution, and the standard deviation calculating means calculates the standard deviation of the converted peak values. The second adjusting means adjusts the knock controlling factors so that the standard deviation becomes a desired value.

According to this invention, as described above, the knock sensor signal is converted so that the frequency distribution of the knock sensor signal becomes an exponential distribution. Thus, since the standard deviation of the frequency distribution can be easily detected, it is possible to decrease the load on the electronic control system, and prevent the knock detection precision from being reduced due to the characteristic change of the knock sensor, engine and so on.

DESCRIPTION OF THE PREFERRED EMBODIMENTS

Figure 1:
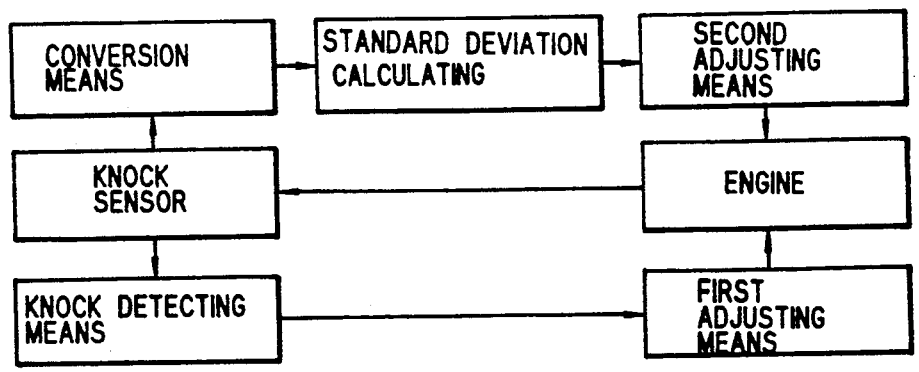
FIG. 1 is a functional block diagram showing the entire system.
Figure 2:
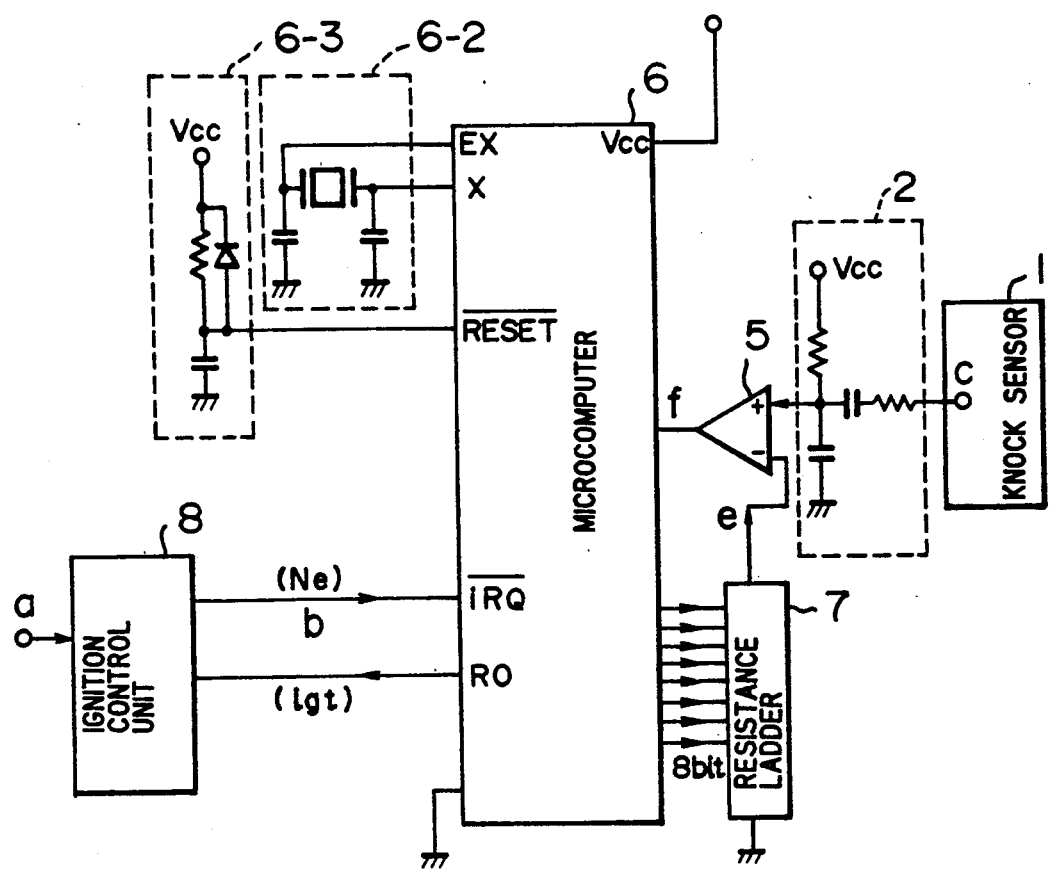
FIG. 2 is a block diagram of an electronic control system and peripheral unit in one embodiment of the invention.

The specific construction and action of an embodiment of a knock control system of the invention will be described with reference to the accompanying drawings. Referring to FIG. 2, there is shown a knock sensor 1 for detecting a vibration or the like due to a knock occurring in an engine, a filter circuit 2 for passing only predetermined frequency components of the detected signal (knock sensor signal) from the knock sensor 1, and a comparator 5 for comparing the detected signal via the filter circuit with an output signal of a resistance ladder 7 by which a digital signal from a microcomputer 6 is converted into an analog signal as the output signal of the resistance ladder. The microcomputer 6 counts a decision pulse from the comparator 5, and supplies a signal to the resistance ladder 7, and a signal to an ignition control unit 8 including an ignitor in accordance with the count result. This computer comprises a central processing unit (CPU), a storage unit (ROM, RAM), an input/output unit (I/O) and so on.

The filter circuit 2 is formed of capacitors and resistors. When the knock sensor signal is passed through the filter circuit 2, the noise components of high frequencies and low frequencies are removed from the knock sensor signal so that only the knock components having frequencies of around 8 kHz can be produced from the filter circuit.

The microcomputer 6 is connected to a known oscillation circuit 6-2, a power supply on-reset circuit 6-3, and a power circuit not shown, which serve as the peripheral circuits. An ignition signal (reference-position waveform-shaped signal) Ne indicating the reference position of the engine, from the ignition control unit 8 is supplied to an interrupt terminal, or iRQ terminal of the microcomputer, and applied a retard angle adjustment in accordance with the result of counting the decision pulse. As a result, the microcomputer produces at an output terminal Ro a calculated ignition timing signal igt and supplies it to the ignition control unit 8.

Meanwhile, the microcomputer 6 is supplied with the output of the comparator 5 which compares the knock sensor signal passed through the filter circuit 2 with the output of the resistance ladder 7 for converting the digital signal of 8 bits from the microcomputer into an analog signal. The compared result is counted by the central processing unit of the microcomputer.

Figure 3:
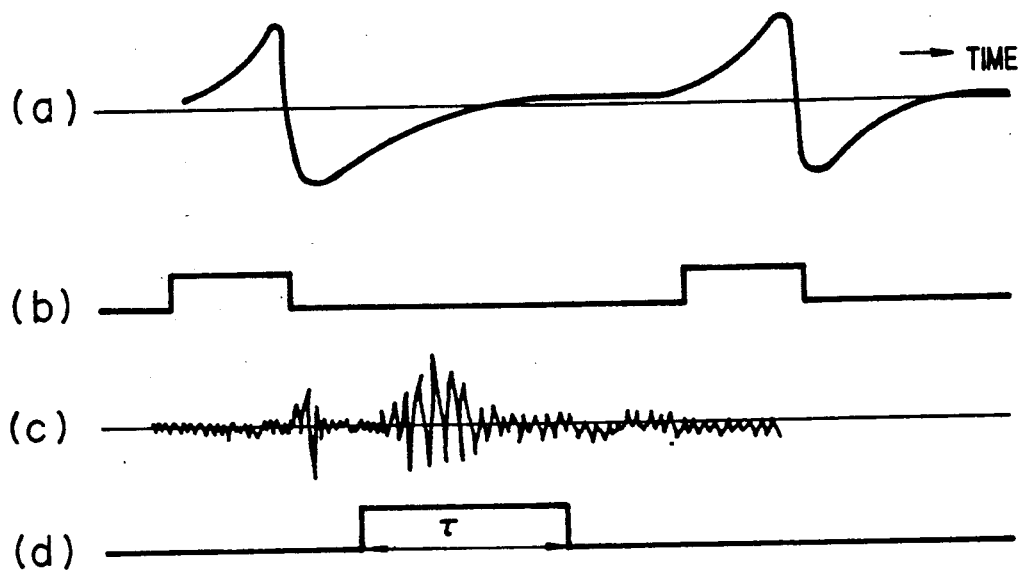
FIGS. 3 and 4 are waveform diagrams of signals in main portions of the system shown in FIG. 2.

Here, the reference position signal shown by a waveform (a) of FIG. 3, which indicates, for example, the maximum advance angle position determined in accordance with the revolution rate of the engine and the load, is reshaped in waveform as a waveform (b) of FIG. 3, which is here referred to as the reference position waveform-shaped signal Ne, and supplied to the iRQ terminal of the microcomputer 6. The knock sensor signal of a waveform (c) of FIG. 3 includes abnormal combustion noise which is caused during an interval $\tau$ (knock judgement interval) of a waveform (d) of FIG. 3, or around 10° CA to 90° CA after the top dead center (TDC) against the reference position waveform shaped signal Ne.

Figure 4:
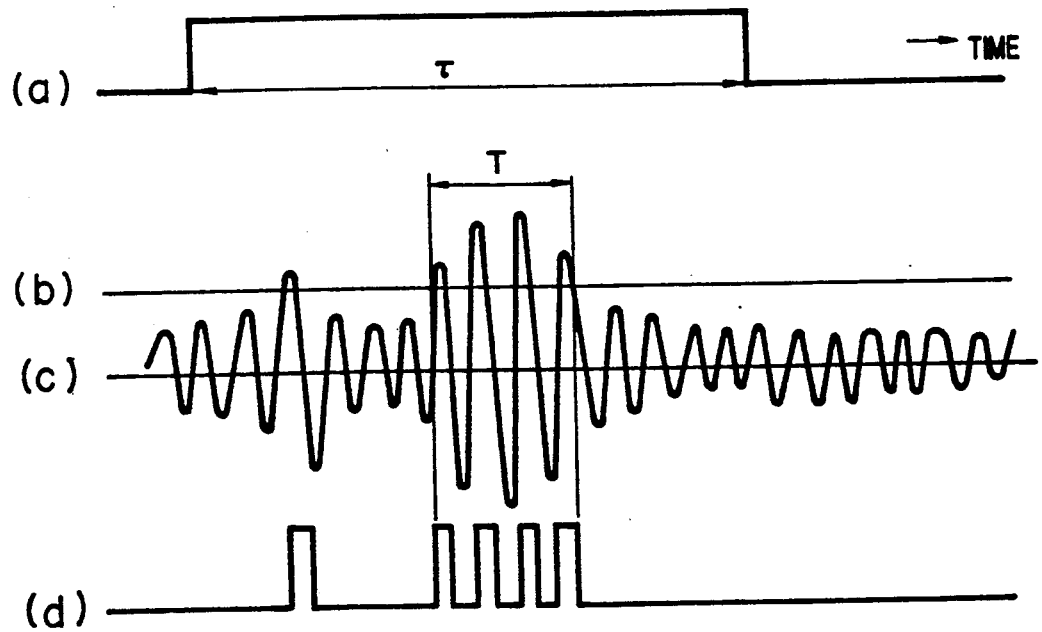

During the knock judgement interval $\tau$ shown in a waveform (a) of FIG. 4 corresponding to around 10° CA to 90° CA after the TDC, a digital to analog converted value e as shown in (d) of FIG. 4, of the reference value $V_{th}$ which is substantially equal to the median value $V_M$ of the peak values of the knock sensor signal, is supplied from the microcomputer, through the resistance ladder 7 as a D/A converter, to the comparator 5, along with the knock sensor signal as shown in (c) of FIG. 4. Thus, the comparator produces the compared result, or the decision pulse as shown in (d) of FIG. 4. Then, the digital-to-analog converted value e is increased or decreased in accordance with the count of the decision pulse.

The operation of this embodiment will be described with reference to the drawings.

It is disclosed that the frequency distribution of the peak value $V_{peak}$ during the knock judgement interval of the knock sensor signal should show a logarithmic normal distribution (for example, JP-A-267574/87). The distribution of the peak values $V_{peak}$, however, changes in shape, depending on the engine state, the characteristics of the knock sensor 1 and so on. Thus, the knock control cannot correctly be made on the basis of only the shape of the distribution of the peak value $V_{peak}$.

Figure 5:
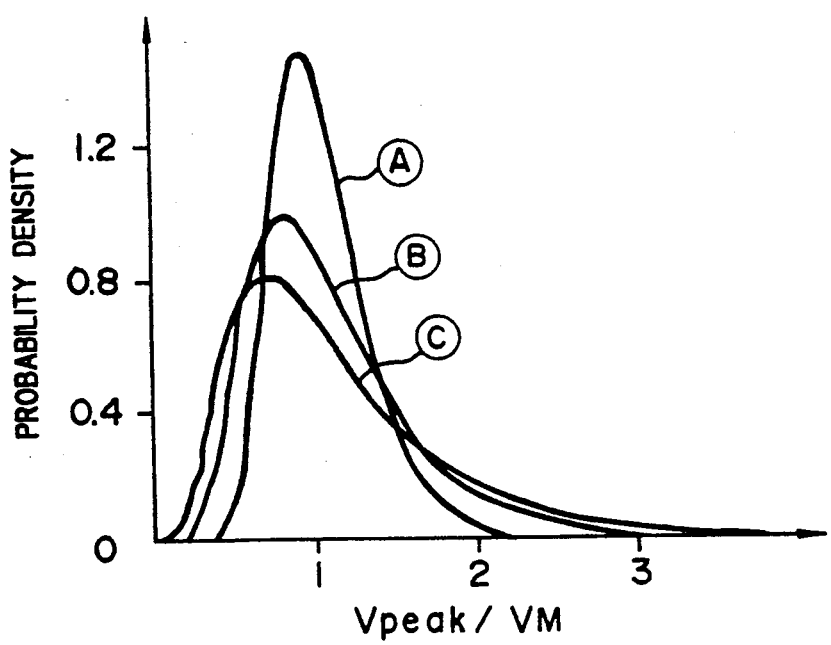
FIGS. 5 and 6 are graphs showing the frequency distributions of the knock sensor signal.

The frequency distribution of the peak value $V_{peak}$ normalized ($V_{peak}/V_M$) by the median value (or an average) of the peak value is as shown in FIG. 5 as Ⓐ to Ⓒ, where waveform Ⓐ shows the state in which no knock occurs, waveform Ⓑ shows the state in which a light knock occurs and waveform Ⓒ shows the state in which a heavy knock occurs. The standard deviations $\rho$ of the waveforms A, B and C are 0.3, 0.4 and 0.6, respectively. In other words, the state in which a knock occurs depends only on the standard deviation $\rho$ of the frequency distribution of the peak value $V_{peak}$ normalized by the median value $V_M$ of the peak values.

Therefore, if the standard deviation $\rho$ is controlled to a desired value, the engine can be maintained in the desired state regarding the occurrence of the knock.

Figure 6:
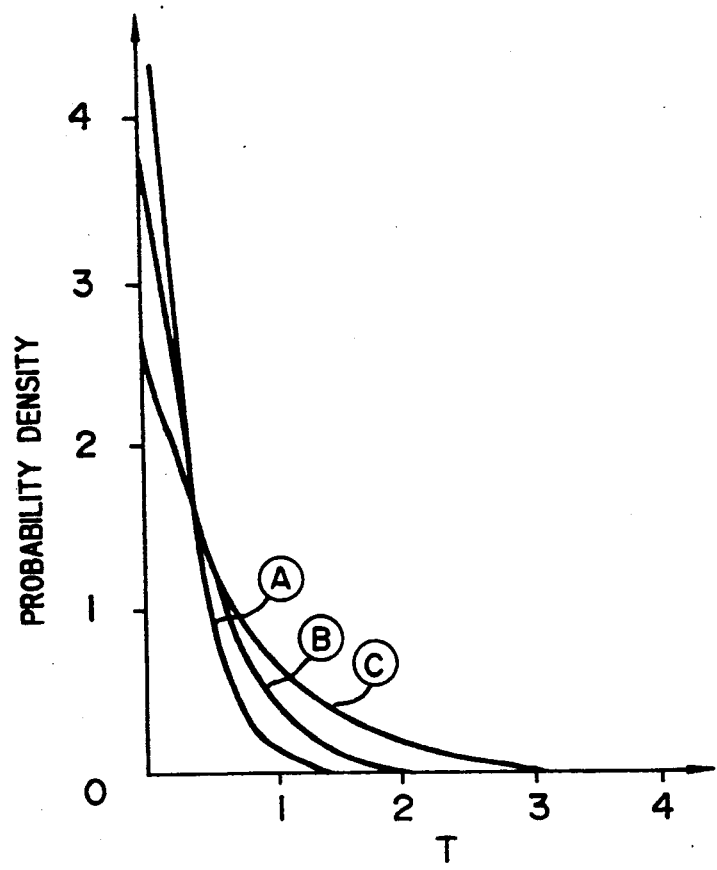

Moreover, the frequency distribution of the knock sensor signal with respect to the duration T for which the peak value $V_{peak}$ exceeds the median value $V_M$ as shown in FIG. 4 becomes near the exponential distribution as shown in FIG. 6. If the frequency distribution relative to the duration T is approximately the exponential distribution, the following equation is satisfied:

standard deviation = average

Thus, the standard deviation $\rho$ can be easily calculated.

The knock detecting method of this invention will be described with reference to the flowchart of FIG. 7.

Steps 501 to 503 correspond to the conversion means, and is a routine for counting the number Kp of the peak value of the knock sensor signal V that exceeds the reference value Vth during the knock judgement interval. Here, since the frequency f of the knock sensor signal V is constant, the duration T is proportional to the number Kp. In this embodiment, hereinafter the knock control is made on the basis of the number Kp.

First, at step 501, decision is made of whether the knock judgement interval has started or not. If it has not started yet, the program is returned to RTN. If the knock judgement interval has started, the program goes to step 502, where the reference level Vth is supplied to the resistance ladder 7. The reference level Vth to be supplied is the level which is calculated and stored at the end of the knock judgement interval of the previous ignition of the same cylinder. The reference level Vth whose maximum voltage is 5 V is expressed by 8 bits (256), and the minimum unit is LSB=19.5 mV. This value is determined by the magnitude of the signal produced by the knock sensor 1. In some case, the dynamic range or resolution is required to change. In this embodiment, the optimum value of the timing range is 5 V divided by 256 (8 bits).

After step 502 where the reference level Vth is outputted, at step 503 checking is made of whether the comparator 5 has produced the pulse output. If no output is produced, or if the knock sensor signal V is smaller than the reference level Vth, the program proceeds to step 505, where a decision is made about whether the knock judgement interval has ended. If the knock judgement interval is continuing, the program returns to step 503. If at step 503 the output pulse is produced, or if the knock sensor signal V is larger than the reference level Vth, the program goes to step 504, where the pulse counter Kp counts up by one. Then, if at step 505 the knock judgement interval is going on, the program is again returned to step 503.

The steps 503 to 505 are repeatedly performed as long as the knock judgement interval continues, and count all the number of pulses Kp generated during the knock judgement interval.

If at step 505 the knock judgement interval has ended, the program goes to step 506. Steps 506 to 509 correspond to the reference level setting means. At step 506 decision is made of whether at least one pulse has occurred during the knock judgement interval. If no pulse occurred at all (Kp=0), the program proceeds to step 509.

At step 509 the reference level Vth is decreased by ΔV (for example, 19.5 mV in this embodiment), and then the program goes to step 518.

If at step 506 at least one pulse is counted during the judgement interval (Kp≧1), the program goes to step 507. At step 507 decision is made of whether the reference level Vth is increased or held depending on the number Kp generated during the knock judgement interval. In this embodiment, when only one pulse is occurred during the knock judgement interval (Kp=1), the reference level is held.

Thus, if the reference level Vth is held, namely it is not renewed, the program proceeds to step 510. If the number Kp during the knock judgement interval is 2 or more (Kp≧2), the reference level Vth is required to increase, and thus the program goes to step 508. At step 508 the reference level Vth is increased by ΔV (for example, 19.5 mV in this embodiment), and the program advances to step 510.

At steps 506 to 509, the reference level Vth is renewed into a level according to the magnitude of the output signal from the knock sensor 1, or the median value $V_M$.

Since, as described above, the reference level Vth is decreased by ΔV when the number of pulses during the knock judgement interval is "0", held as it is when the number of pulses is "1", and increased by ΔV when the number of pulses is 2 or more, the reference level Vth can take the median value from the viewpoint of statistical observation of the magnitude of the output signal of the knock sensor 1.

Then, at step 510 the number of pulses Kp in this control timing is added to the accumulated value AKp in the previous control timing. At step 511, the counter C counts up by one. The counter C counts depending on the correction period in which correction is made in accordance with the knock state. At step 512, decision is made of whether the correction timing has come or not, or more particularly whether the counter C has a predetermined value Co (for example, 100 in this embodiment) or not. If it is YES, the program goes to step 513, where correction is made according to the knock state. If it is NO, the program advances to step 518, where knock detection is made. When the predetermined value Co is 100, the correction period is about 200 ignition cycles. This is because the probability that the number of pulses Kp is above 1 is about 50% since the reference level Vth is selected to be the median value $V_M$.

Steps 513 to 517 correspond to the first adjusting means for adjusting the standard deviation ρ to be a desired value (for example, 4 to 5, in this embodiment since the frequency of the knock sensor 1 is considered as 8 kHz).

The standard deviation ρ is equal to the average as described above, and thus can be determined as follows.

$$\rho = A\ Kp/C$$

Moreover, in this embodiment, since the standard deviation ρ, when calculated by the above equation, causes cancellation of significant digit peculiar to the electronic control system, the accumulated value AKp is controlled to be a desired value as follows.

$$\rho_2 \leq \rho \leq \rho_1$$

$$C \cdot \rho_2 \leq AKp \leq C \cdot \rho_1$$

First, at step 513 decision is made of whether the accumulated value AKp is larger than the first predetermined value LKp ($=C \cdot \rho_1$; for example, 500 in this embodiment). When the accumulated value AKp is larger than the first predetermined value LKp, a larger knock than the desired knock state is considered to occur, and at step 514 the learning advance angle value $\theta_L$ is retarded by a cirtain angle $\Delta\theta_1$ (for example, 0.25° CA in this embodiment, and in this case the certain angle $\Delta\theta_1$ is smaller than a retard angle amount $\Delta\theta_R$, and $\Delta\theta_1$=about $\Delta\theta_R/4$), then the program advances to step 517.

When at step 513 the accumulated value AKp is smaller than the first predetermined value LKp, at step 515 decision is made of whether the accumulated value AKp is smaller than the second predetermined value SKp ($=C \cdot \rho_2$, for example, 400 in this embodiment) or not. If the accumulated value AKp is larger than the second predetermined value SKp, the desired knock state is achieved, and thus without correction the program goes to step 517.

If at step 515 the accumulated value Kp is smaller than the second predetermined value SKp, less knock occurs than the desired knock state, and thus at step 516 the learning advance angle value $\theta_L$ is advanced by a predetermined angle $\Delta\theta_2$ (for example, 0.25° CA in this embodiment), then the program goes to step 517. At step 517, the counter C and the accumulated value AKp are reset. At step 518 knock detection is made.

Steps 518 to 520 correspond to the knock detecting means for deciding the presence or absence of the knock according to the number of pulses Kp during the knock judgement interval. Since the number of pulses Kp in the presence of the knock is proportional to the duration T of the output signal of the knock sensor 1, more knock than normal occurs. Therefore, when more pulses than the knock judgement level (predetermined value) N occurs, it can be decided that knock has occurred. In this embodiment, the predetermined value N is selected to be "18".

Thus, when at step 518 the number of pulses Kp during the knock judgement interval is larger than the predetermined value N, the program goes to step 519, where the knock flag KF is set (KF=1). If the number of pulses Kp is smaller than the value N, the program goes to step 520, where the knock flag is cleared (KF=0). Thus, the amount of retard angle in the ignition timing is controlled.

Figure 8:
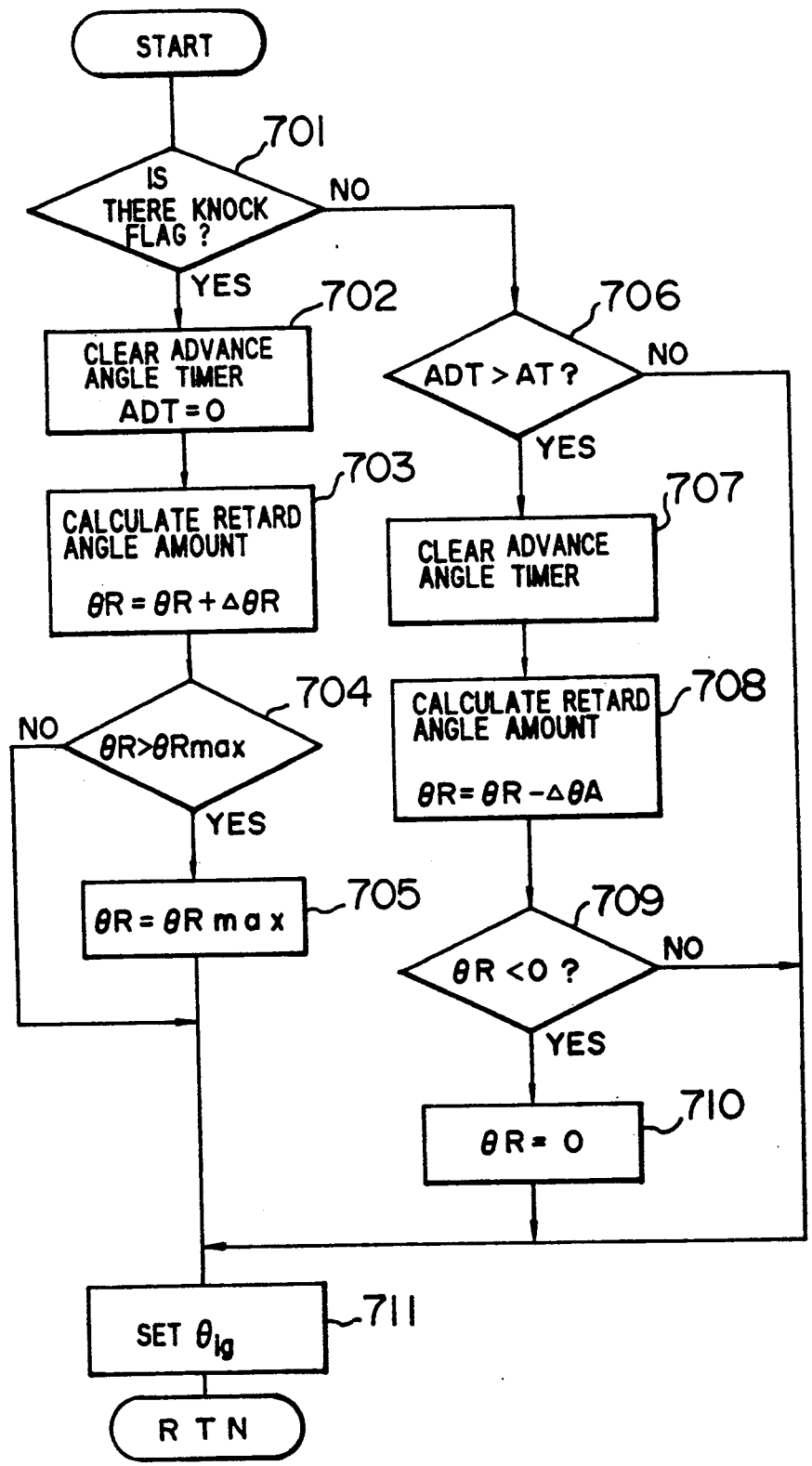
FIG. 8 is a flowchart for setting the ignition timing based on the knock judgement.

The calculation of the ignition timing will be described with reference to the flowchart of FIG. 8. At step 701, decision is made of whether the knock flag Fk is set or not. If it is set, or the knock occurs, the program goes to step 702.

At step 702, an advance angle timer ADT is cleared which counts time for determining the timing in which the retard angle amount $\theta_R$ is decreased for advancing angle at every constant time from the occurrence of the knock. The advance angle timer ADT is again started to count after clearing.

Then, at step 703, the amount of retard angle $\theta_R$ is calculated. In other words, the amount of retard angle per knock, $\Delta\theta_R$ (for example, 1° CA in this embodiment) is added to the amount of retard angle $\theta_R$. Thus, the ignition timing is retarded by $\theta_R$.

At step 704, the retard angle amount $\theta_R$ and the maximum retard angle amount $\theta_{Rmax}$ are compared with each other. If the retard angle amount $\theta_R$ is larger than the maximum retard angle amount, the program is advanced to step 705. The maximum retard angle amount $\theta_{Rmax}$ is set considering the exhaust temperature rise upon retarding and the change of knock limit depending on season. It is generally about 10° CA. At step 705, the retard angle amount $\theta_R$ is again set to the maximum retard angle amount $\theta_{Rmax}$ and the program returns to RTN.

When at step 701, the knock flag is not set, the program is advanced to step 706.

At step 706 decision is made of whether the value of the advance angle timer ADT has reached the advance angle set time AT. If the advance angle timer ADT is smaller than the set time AT, the program is returned to RTN.

If the advance angle timer ADT is larger than the set time AT, the advance angle timer is cleared. In this case, for example, in order that the ignition timing is advanced considering that the set time (for example, 0.4 sec) has elapsed from the ignition at the last knock generation, the program goes to step 707.

At step 707, the advance angle timer is cleared and the program proceeds to step 708. At step 708 the advance angle amount $\Delta\theta_A$ (for example, 0.25° CA) at every set time is subtracted from the retard angle amount $\theta_R$. Thus, the next ignition timing is advanced by $\Delta\theta_A$.

At step 709, decision is made of whether $\theta_R$ is 0 or not. If it is larger than 0, the program goes to RTN. If $\theta_R$ is smaller than 0, the program goes to step 710, where $\theta_R$ is cleared, and the program goes to RTN.

At step 711, the ignition timing $\theta_{ig}$ is determined from the following equation.

$$\theta_{ig}=\theta_{BASE}+\theta_R+\theta_L$$

where $\theta_{BASE}$ is the fundamental ignition advance angle value which is set according to the revolution rate of engine, amount of inlet air and so on.

Thus, according to this invention, the knock sensor signal is converted to the number of pulses which are produced when the knock sensor signal during the knock judgement interval is larger than the reference level Vth, and used to make knock control. Since the frequency distribution of the pulse number shows an exponential distribution, the standard deviation can be obtained easily, and thus the load on the electronic control system can be reduced.

Moreover, since the ignition timing is advanced or retarded by the predetermined angle $\Delta\theta_1$ at a time which is smaller than the retard angle amount $\Delta\theta_R$ per knock for fine adjustment so that the standard deviation reaches a desired value, the change of the ignition timing, or the torque variation can be suppressed.

Moreover, since as described above the desired standard deviation is obtained in the steady state by fine adjustment, it is satisfactory that only such a large knock as generated at the transient time can be detected, and thus the knock judgement level is not necessarily to be the precise knock judgement level N as in the prior art.

Figure 7:
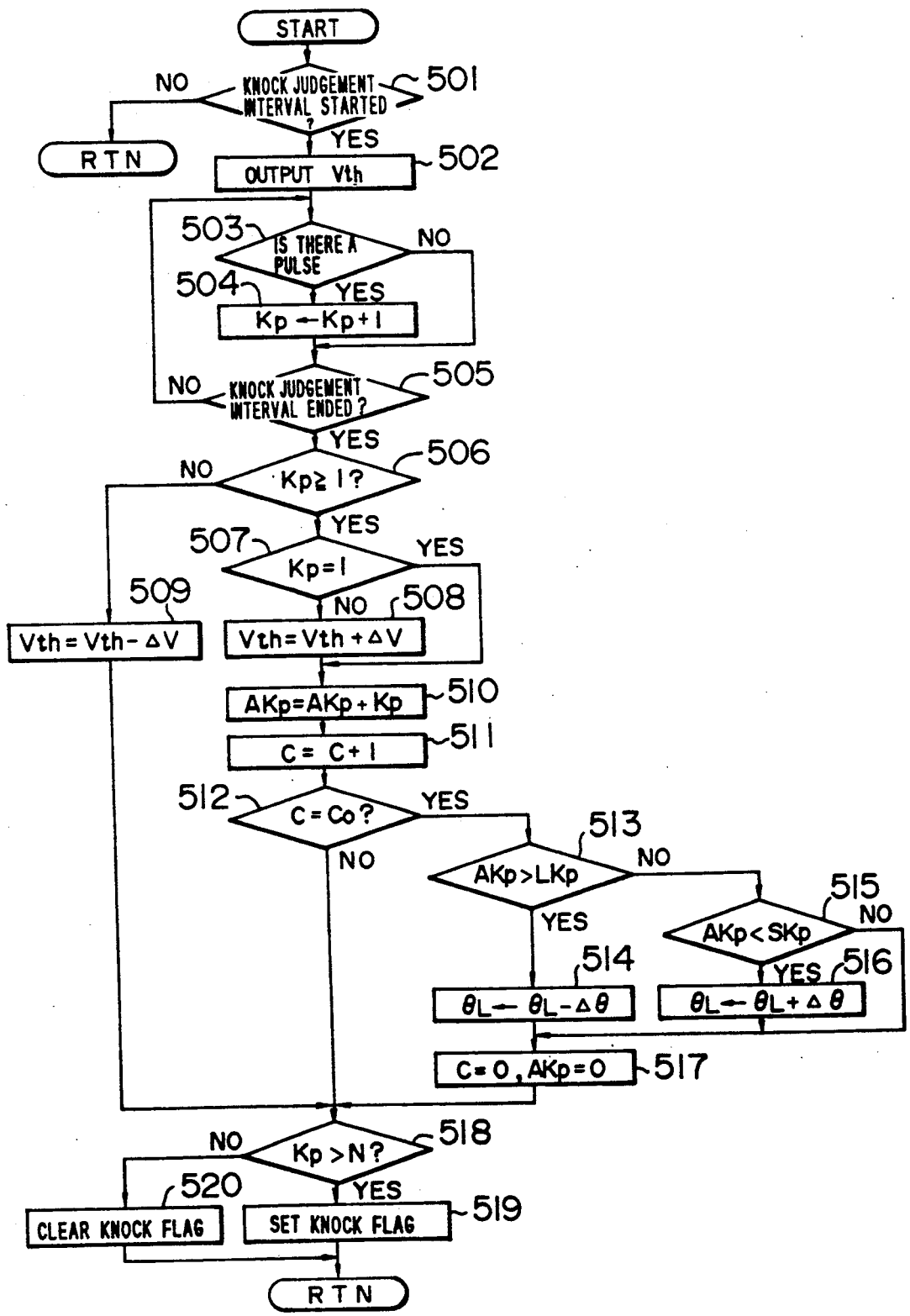
FIG. 7 is a flowchart for the computation of knock judgement.

In addition, for the above reasons, the knock detection at steps 518 to 520 in FIG. 7 can be made only at the transient time.

Figure 9:
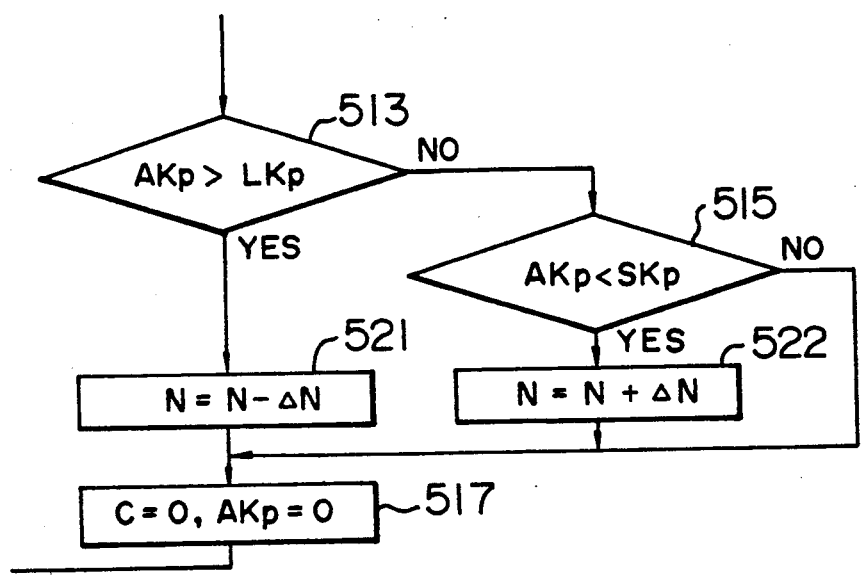
FIG. 9 is a flowchart for another embodiment.

Moreover, while in this embodiment, when the standard deviation $p$ is deviated from a certain value as shown at steps 514 and 515 in FIG. 7, the ignition timing is advanced or retarded so that the standard deviation $p$ can reach a desired value, the knock judgement level N may be increased or decreased as shown in FIG. 9 at steps 521 and 522. More specifically, when at step 513 in FIG. 9 the accumulated value AKp is larger than the first predetermined value LKp, a larger knock than a desired knock state occurs, and thus at step 521 the knock judgement level N is again set to be decreased by a predetermined value $\Delta$N (for example, 1 in this embodiment). Also, when at step 515 the accumulated value AKp is smaller than the second predetermined value SKp, less knock than the desired knock state occurs, and thus at step 522 the knock judgement level N is again set to be increased by a certain value N.

Moreover, while in this embodiment since during the knock judgement interval the pulse count Kp produced when the knock sensor signal V is larger than the reference level Vth is proportional to the duration T in which the knock sensor signal V is larger than the reference level Vth, the knock control is made on the basis of the standard deviation of the frequency distribution of the pulse count Kp, the peak value $V_{peak}$ of the knock sensor signal V within the knock judgement interval may be converted to the duration T.

Figure 10:
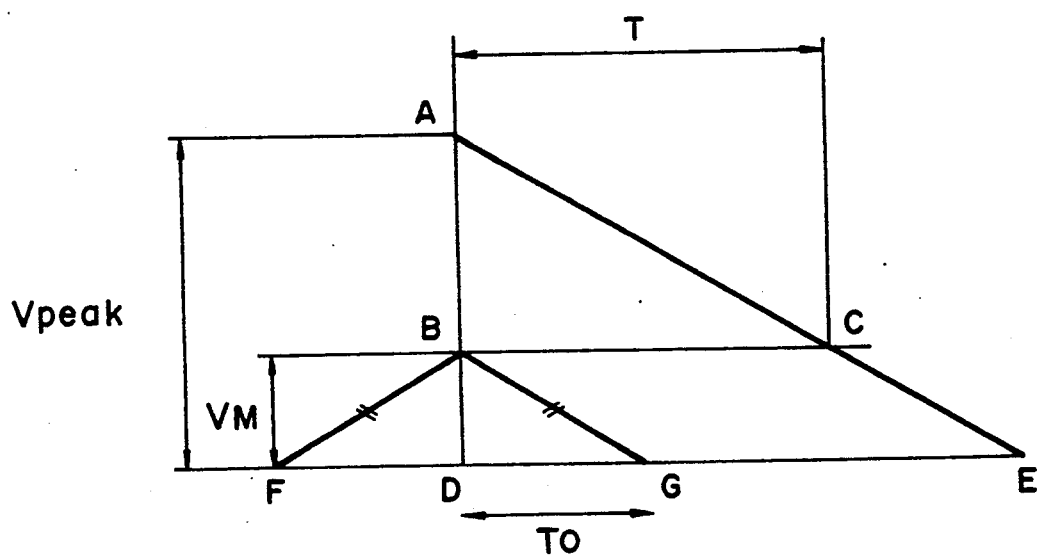
FIG. 10 shows a mathematical model of the envelope of the knock sensor signal.

A description will be made of the method of converting the peak value of the knock sensor signal V during the knock judgement interval to the duration T. FIG. 10 shows a mathematical model of the envelope of the knock sensor signal. In FIG. 10, the triangle $\triangle$FGB is the mathematical model for the case in which the peak value $V_{peak}$ and the median value $V_M$ are equal, and the figure ABFE is the mathematical model for the case in which knock occurs. Since the triangle $\triangle$ABC is similar to the triangle $\triangle$BDG, the following equation is satisfied.

$$(V_{peak}-V_M):V_M=T:T_o$$

Thus, the duration time T can be determined by the following equation.

$$T = T_o \times [(V_{peak}/V_M) - 1]$$

Figure 11:
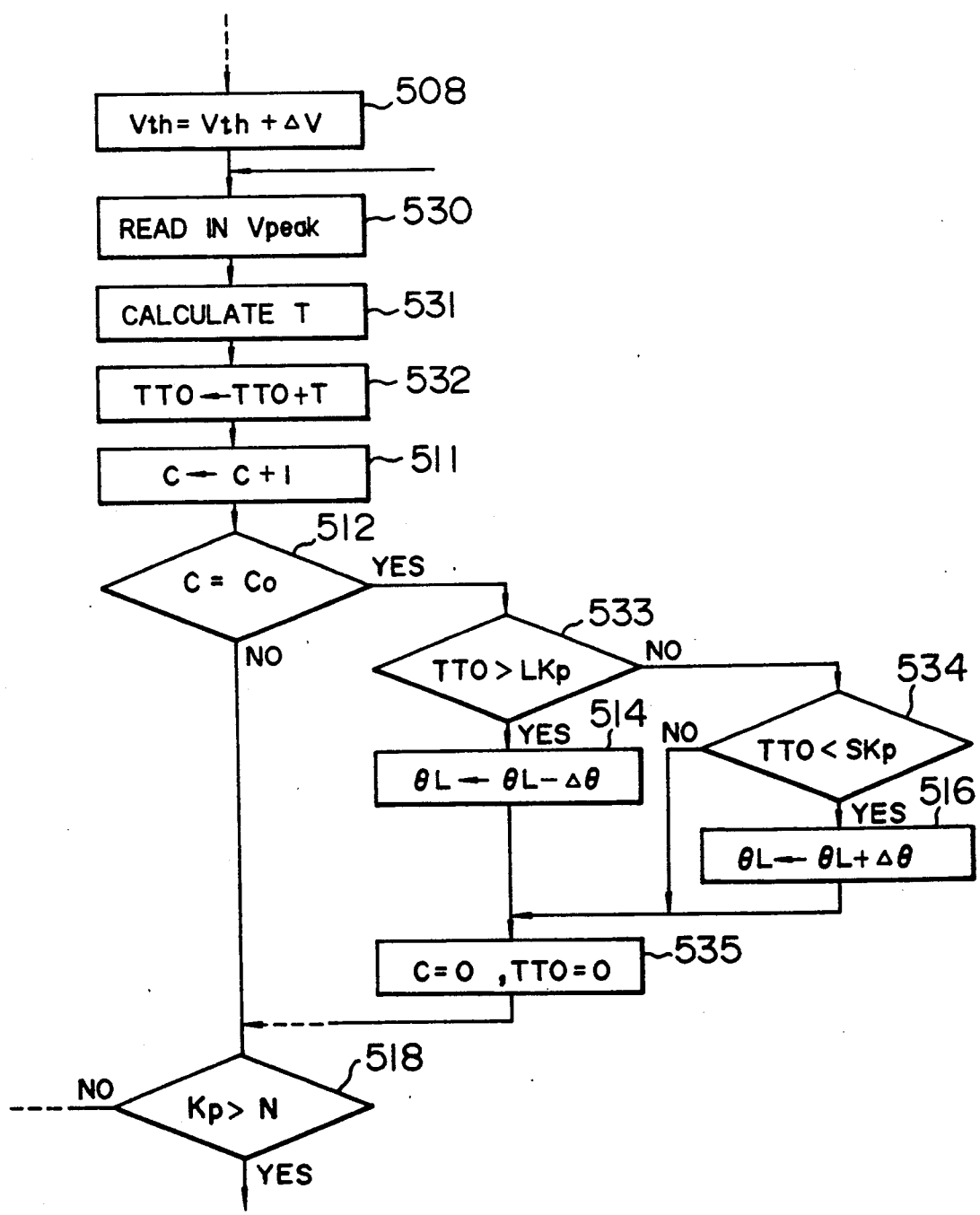
FIG. 11 is a flowchart for still another embodiment.

An embodiment in which the peak value $V_{peak}$ is used in this invention will be described with reference to the flowchart of FIG. 11. The flowchart shown in FIG. 11 is a modification of the flowchart of FIG. 7, or the steps 510 to 517 are removed. In FIG. 11, like steps corresponding to those in FIG. 7 are identified by the same reference numerals.

At step 508, the reference level Vth is renewed. At step 530, the peak value is read in. This peak value $V_{peak}$ is read in from a peak hold circuit not shown in FIG. 2. Then, at step 531 the duration T is calculated from the following equation.

$$T = T_o \times [(V_{peak}/V_M) - 1]$$

where To is the reference time, or a constant experimentally determined in advance (for example, 2 msec in this embodiment).

At step 532, the accumulated value TTo is added with the duration T in this control timing. At steps 511 and 512 decision is made of whether the timing is corrected or not as in the above embodiment.

If the timing is corrected, at step 533 decision is made of whether the accumulated value TTo is larger than the first predetermined value LKp or not. If the accumulated value is larger than the first predetermined value, at step 514 the learning advance angle $\theta_L$ is retarded by a predetermined angle $\Delta\theta_1$ as in the above embodiment. If at step 533 the accumulated value TTo is smaller than the first predetermined value LKp, the program goes to step 534. At step 534, decision is made of whether the accumulated value TTo is smaller than the second predetermined value SKp or not. If the accumulated value is smaller than the second predetermined value, at step 516 the learning advance angle value $\theta_L$ is retarded by a predetermined angle $\Delta\theta_2$ as in the above embodiment. At step 535 the counter C and the accumulated value TTo are reset.

Moreover, by using the equation for converting the peak value $V_{peak}$ into the duration T, it is possible to apply this invention to such system for knock judgement from the peak value $V_{peak}$ as disclosed in JP-A-267574/87.

We claim:

1. A knock control system for an engine comprising:
   a knock sensor for detecting a knock sensor signal from which a knock occurring in an engine can be determined;
   knock detecting means for detecting, and outputting a detection signal of, an occurrence of the knock in accordance with the knock sensor signal;
   first adjusting means for adjusting at least one of a plurality of knock controlling factors so as to suppress the knock on the basis of the detection signal;
   conversion means for converting at least one peak value of the knock sensor signal in a manner as to transform a frequency distribution of the at least one peak value into an exponential distribution;
   standard deviation calculating means for calculating a standard deviation of converted peak values converted by said conversion means; and
   second adjusting means for adjusting at least one of the knock controlling factors so as to make the standard deviation calculated by said standard deviation calculating means equal to a predetermined value at which knock is decreased.

2. A knock control system of claim 1, wherein the conversion means comprises reference level setting means for setting a reference level in relation to the peak value, and duration detecting means for detecting a duration for which the peak values successively exceed the reference level within a predetermined period of time for knock judgment in one ignition cycle.

3. A knock control system of claim 2, wherein the duration detecting means comprises counting means for counting the number of, and outputting a count of, the peak values successively exceeding the reference level within the predetermined period of time in one ignition cycle.

4. A knock control system of claim 2, wherein the duration detecting means comprises maximum value detecting means for detecting a maximum value, a median value calculating means for calculating a median value of the frequency distribution of the said maximum value, and a duration calculating means for calculating the duration on the basis of said maximum value and said median value.

5. A knock control system of claim 1, wherein the second adjusts means adjust at least one of a knock judgement level and an ignition timing.

6. A knock control system of claim 1, wherein the knock detecting means detects in accordance with the knock judgement level adjusted by the second adjusting means.

7. A knock control system for an engine comprising:
   a knock sensor for detecting a knock sensor signal from which a knock occurring in an engine can be determined;
   reference level setting means for setting a reference level in relation to a peak value of the knock sensor signal;
   counting means for counting a number of, and outputting a count of, values successively exceeding the reference level within a predetermined period of time in one ignition cycle;
   knock detecting means for detecting, and outputting a detection signal of, an occurrence of the knock in accordance with said count;
   ignition timing adjusting means for adjusting the ignition timing in accordance with said detection signal;
   mean value calculating means for calculating a mean value of the counts for at least one predetermined ignition cycle; and
   learning advance angle setting means for setting a learning advance angle which adjusts the ignition timing so as to make the mean value equal to a predetermined value.

8. A knock control system of claim 7, wherein the reference level setting means comprises median value calculating means for calculating a median value of a frequency distribution of the counts.

9. A knock control system of claim 7, wherein the learning advance angle setting means comprises retard angle adjusting means for adjusting by retarding the learning advance angle by a first predetermined angle when the mean value is larger than a first predetermined value, and advance angle adjusting means for adjusting by advancing the learning advance angle by a second predetermined angle when the mean value is smaller than a second predetermined value.

10. A knock control system of claim 7, wherein the learning advance angle setting means adjusts the learning advance angle in every predetermined adjusting period.

11. A knock control system of claim 7, wherein the knock detecting means comprises knock judgement means for judging that the knock is occurring in the engine when the count exceeds a knock judgement level.

12. A knock control system of claim 7, wherein the knock detecting means comprises knock judgement level adjusting means for adjusting the knock judgement level so as to make the mean value equal to a predetermined value.

13. A knock control system for an engine comprising:
   a knock sensor for outputting a knock sensor signal from which a knock occurring in the engine can be calculated, every knock sensor signal having a peak value thereof;
   a reference level setting means for setting a reference level in relation to the peak value;
   counting means for counting a number of, and outputting a count of, values successively exceeding the reference level within a predetermined period of time in one ignition cycle;
   knock determining means for determining that the knock is occurring in the engine when the count exceeds a knock judgement level and outputting a knock judgement signal indicative thereof;
   ignition timing adjusting means for adjusting ignition timing in accordance with the knock determining signal;
   mean value calculating means for calculating a mean value of the counts for predetermined ignition cycles; and
   knock determining level adjusting means for adjusting the knock determining level so as to make the mean value equal to a predetermined value.

14. A knock control system of claim 13, wherein the knock judgement level adjusting means comprises decreasing adjusting means for decreasing the knock judgement level when the mean value is larger than a first predetermined value, and increasing adjusting means for increasing the knock judgement level when the mean value is smaller than a second predetermined value.

15. A knock control system of clam 3, wherein the standard deviation calculating means comprises accumulating means for accumulating the count outputted from the counting means within predetermined ignition cycles.

16. A knock control system of claim 15, wherein the second adjusting means comprises judging means for judging whether an accumulated count accumulated by the accumulating means falls within a predetermined range and control means for controlling the knock controlling factors so as to make the accumulated count fall within the predetermined range.

17. A knock control system of claim 4, wherein the duration detecting means comprises accumulating means for accumulating the duration detected within predetermined ignition cycles.

18. A knock control system of claim 17, wherein the second adjusting means comprises judging means for judging whether or not an accumulated duration accumulated by the accumulating means falls within a predetermined range and control means for controlling the knock controlling factors so as to make the accumulated duration fall within the predetermined range.

* * * * *